Figure 1:
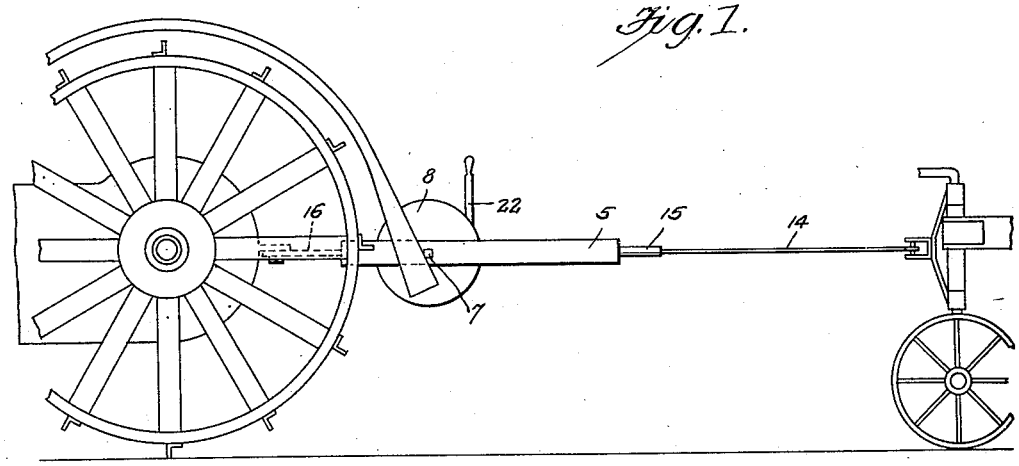

Dec. 29, 1931.  F. D. HELMKE  1,839,099
TRACTOR HITCH
Filed April 30, 1929   2 Sheets-Sheet 1

Inventor
Fredrich D. Helmke,

By *Clarence A. O'Brien*
Attorney

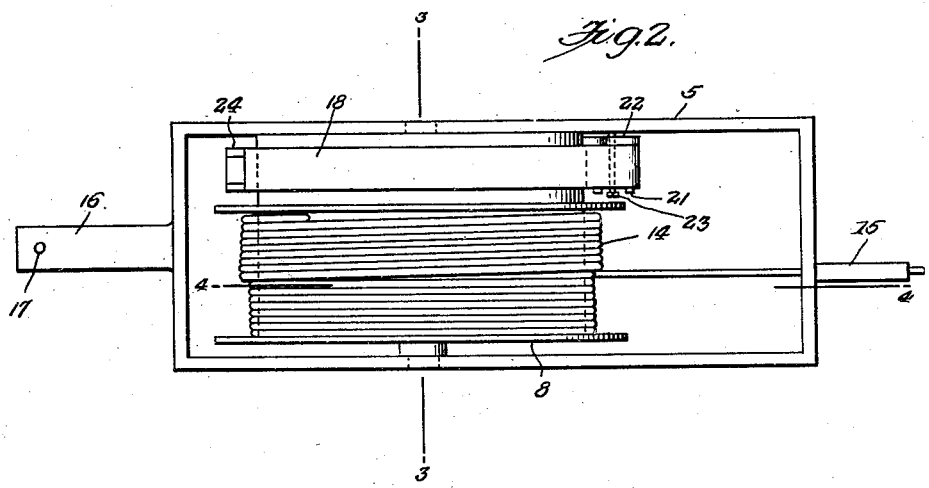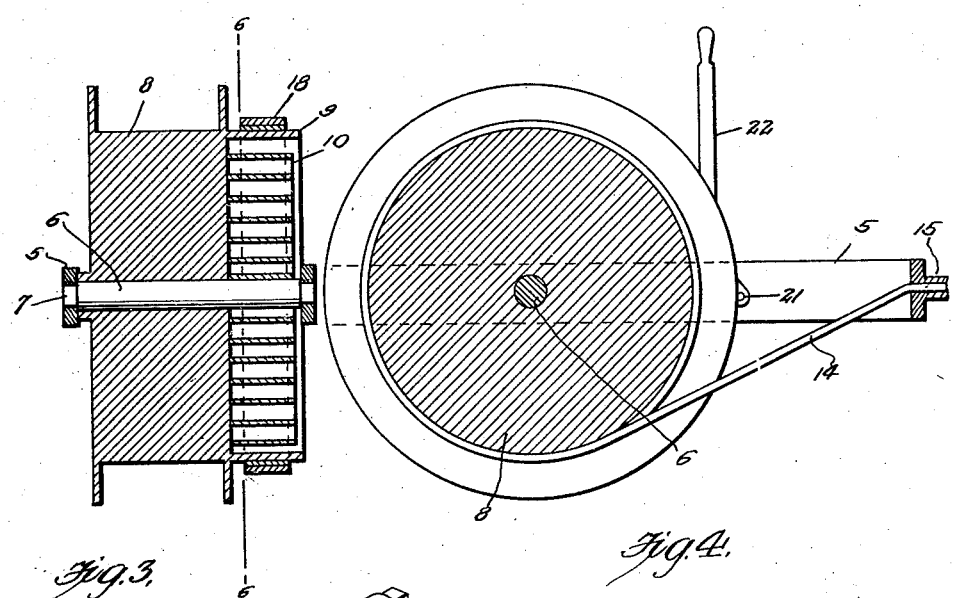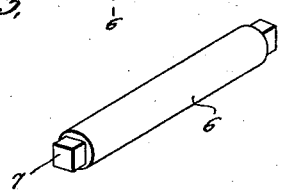

Patented Dec. 29, 1931

1,839,099

UNITED STATES PATENT OFFICE

FREDRICH D. HELMKE, OF PRATT, KANSAS

TRACTOR HITCH

Application filed April 30, 1929. Serial No. 359,278.

The present invention relates to means for connecting trailers, agricultural implements or other rolling or drag devices for tractors, automobiles or other vehicles.

The object of my invention is to provide a vehicle connection or hitch for the purpose outlined which will permit relative separation of the drawing and drawn vehicles under certain haulage conditions, principally such as when encountering mud holes on the road or soft areas in field operations.

A still further very important object of the invention resides in the provision of an apparatus of this nature which is simple in its construction, inexpensive to manufacture, strong and durable, handy and easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 6:
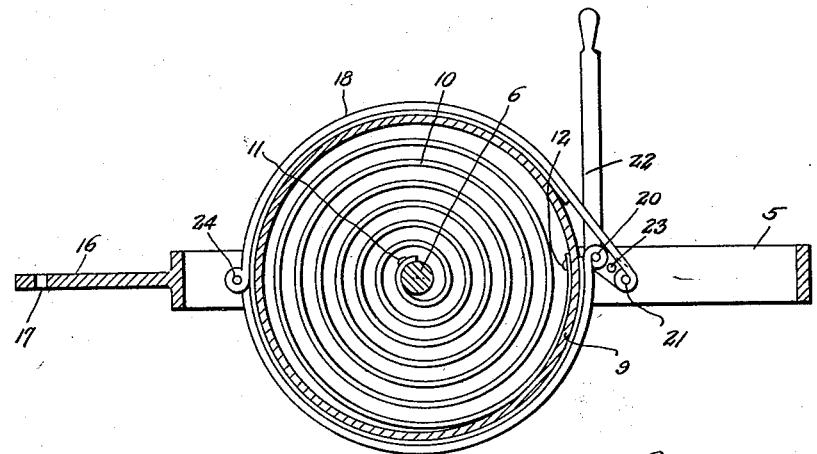
Figure 7:
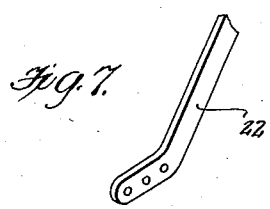

In the drawings:

Figure 1 is a side elevation of my improved apparatus showing fragmentarily the rear end of a tractor and the front end of a towed implement, Figure 2 is a top plan view of the apparatus, Figure 3 is a transverse section therethrough taken substantially on the line 3—3 of Figure 2, Figure 4 is a sectional view taken substantially on the line 4—4 of Figure 2, Figure 5 is a perspective view of the shaft, Figure 6 is a sectional view taken substantially on the line 6—6 of Figure 3, and Figure 7 is a perspective view of the pivoted end of the lever.

Referring to the drawings in detail it will be seen that the numeral 5 denotes a rectangular frame. A shaft 6 has reduced squared end 7 mounted in square openings in the sides of the frame 5. A drum 8 is journaled on the shaft 6 and has a laterally extending annular flange 9 projecting from one side thereof. A coil spring 10 is anchored to the shaft 6 at its inner end as at 11 and is anchored at its outer end as at 12 to the inside of the annular flange 9 and tends to normally hold a cable 14 wound on the drum.

The end of this cable is trained through a tube 15 fixed to the rear end of the frame and projecting rearwardly therefrom. The bar 16 projects forwardly from the front end of the frame and has an opening 17 so that it may be attached to the draw bar of a tractor or other suitable towing implement.

The free end of the cable is attached to the towed implement. A brake band 18 is disposed about the flange 9 and has one end anchored as at 20 to the frame 5 while the other end is fixed as at 21 to the lower extremity of a lever 22 which has its pivot 23 to the frame 5 intermediate the connections 20 and 21 with the brake band 18.

This brake band 18 is preferably formed in two sections pivotally connected together as at 24. Obviously by rocking the lever 22 the brake band may be tightened or loosened in respect to the flange 9.

From the above detailed description it will be seen that if the tractors should come to a muddy place in the field and the wheels start to slipping, the brake band 18 may be released and the tractor moved over the bad spots and then the brake band tightened so as to continue the towing operation and when on good ground again the brake band may be released and the tractor backed up toward the towed implement and the spring 10 will automatically take up the cable as will be quite apparent.

From the above detailed description it will be seen that I have devised an apparatus which is exceedingly compact, convenient and efficient and yet possessed of a simple construction.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

An apparatus of the class described comprising a rectangular frame, a shaft transversely disposed in said frame, a solid drum having an annular flange projecting laterally from one side of the drum, defining a cylinder, said drum rotatably mounted on the shaft, a torsion spring disposed in the cylinder, one end of the spring attached to the cylinder and the opposite end to the shaft, a brake band mounted on said cylinder, and a brake lever pivotally mounted to one side of said rectangular frame and being operatively associated with said brake band.

In testimony whereof I affix my signature.

FREDRICH D. HELMKE.